United States Patent [19]

Krishnamurthy et al.

[11] Patent Number: 4,849,194
[45] Date of Patent: Jul. 18, 1989

[54] MEASUREMENT AND CONTROL OF ZEOLITE SYNTHESIS

[75] Inventors: Sowmithri Krishnamurthy, Cherry Hill; Donald J. Klocke, Somerdale, both of N.J.

[73] Assignee: Mobil Oil Corporation, New York, N.Y.

[21] Appl. No.: 262,201

[22] Filed: Oct. 19, 1988

Related U.S. Application Data

[63] Continuation of Ser. No. 53,905, May 26, 1987, abandoned.

[51] Int. Cl.$^4$ .............................................. C01B 33/26
[52] U.S. Cl. .................................. 423/328; 23/293 R; 23/295 R; 423/DIG. 5; 423/DIG. 6; 436/4; 502/77
[58] Field of Search .......... 423/328, DIG. 6, DIG. 5; 436/4, 149; 422/105; 23/293 R, 295 R; 502/77

[56] References Cited

U.S. PATENT DOCUMENTS

| | | | |
|---|---|---|---|
| 3,923,697 | 12/1975 | Ellis | 252/502 |
| 3,999,040 | 12/1976 | Ellis | 106/296 |
| 4,025,307 | 5/1977 | Randolph et al. | 436/4 |
| 4,038,050 | 7/1977 | Lowther | 55/18 |
| 4,046,509 | 9/1977 | Backerud | 436/4 |
| 4,053,864 | 10/1977 | Rodriguez | 212/512 |
| 4,056,364 | 11/1977 | Dmistrovsky et al. | 23/295 R |
| 4,064,074 | 12/1977 | Ellis | 252/502 |
| 4,263,010 | 4/1981 | Randolph | 23/295 R |
| 4,277,441 | 7/1981 | Sachs | 422/105 |
| 4,557,858 | 12/1985 | Galloway | 423/332 |

*Primary Examiner*—Anthony Mc Farlane
*Attorney, Agent, or Firm*—Alexander J. McKillop; Charles J. Speciale; Malcolm D. Keen

[57] ABSTRACT

The crystallization of a crystalline silicate product from an crystallization mixture is monitored by measuring the specific electrical conductivity of the mixture. The crystallization of metallosilicates, such as aluminosilicate zeolites, may be monitored in this way. Measurement of the electrical conductivity of the crystallization mixture may be carried out on line in a batch or continuous crystallization process. In a continuous process the conductivity may be monitored and used to control the crystallization process parameters in order to achieve a desired degree of crystallinity in the product.

17 Claims, 2 Drawing Sheets

MEASUREMENT AND CONTROL OF ZEOLITE SYNTHESIS

This is a continuation of copending application Ser. No. 053,905, filed on May 26, 1987 now abandoned.

FIELD OF THE INVENTION

This invention relates to a method for controlling the synthesis of zeolites and other relates synthetic products which are produced from an aqueous synthesis mixture. It is particularly suitable for the control of synthesis of aluminosilicate zeolites but may also be used with other metallosilicates such as ferrosilicates, gallosilicates, germanosilicates and borosilicates as well as with other synthetically related materials.

BACKGROUND OF THE INVENTION

Synthetic crystalline silicate materials are now used extensively as catalysts in a number of industries, especially the petroleum refining, petrochemical and chemical industries. These synthetic silicate catalytic materials are generally characterized as being solid, porous, crystalline silica-containing materials whose utility as catalysts is predicated upon their possession of defined and characteristic pore sizes and ordered, internal structures which confer specific catalytic properties on these materials. The most common class of synthetic silicate catalysts has been the aluminosilicate zeolites and of these, the materials which have probably been produced in the largest quantities are the large pore size aluminosilicate zeolites, exemplified by the synthetic faujasites zeolite X and zeolite Y, which are widely used in the catalyst cracking process of converting high-boiling petroleum feeds to lower-boiling products, especially gasoline, as well as in the hydrocracking process which also forms an important part of petroleum refinery operations. The other class of synthetic silicate catalytic materials which are produced in large quantities are the intermediate pore size silicates, especially the intermediate pore size aluminosilicate zeolites, such as ZSM-5, which are important catalysts in many petrochemical processes such as the isomerization of xylenes, the disproportionation of toluene, the production of various para-substituted aromatic compounds, e.g. para-ethyltoluene, as well as in petroleum refining processes, especially catalytic dewaxing, e.g. the dewaxing of distillates and the dewaxing of lubricants. The intermediate pores size materials which have achieved the greatest success are the aluminosilicate zeolites and these may have various silica:alumina ratios, typically from about 30:1 or higher, e.g. 70:1, 200:1 or ever higher. It is, however, not required that the silicate should be an aluminosilicate because other trivalent metals may provide the required acidic functionality which characterizes these catalytic materials. For example, U.S. Pat. No. 3,702,886, which describes ZSM-5 discloses the possibility for using gallium as a substituted for aluminum, U.S. Pat. No. 4,269,813 and BE 859,056 discloses borosilicate materials, and U.S. Pat. No. 4,238,318 discloses ferrosilicates which also possess shape-selective catalytic properties characterized by the possession of acidic functionality at internal sites within the structure of the silicate to which access is controlled by the characteristic crystalline structure of the silicate. Other trivalent cations such as chromium or phosphorus may also be present in these silicates, as disclosed, for example, in U.S. Pat. Nos. 4,414,423; 4,417,086; 4,517,396 and 4,309,280. The presence of metals within the silicate structure is, in fact, by no means essential to the crystalline structure or to the possession of catalytic properties, as disclosed in U.S. Pat. No. 3,941,871. A material described as a silica polymorph is described in U.S. Pat. No. 4,061,724 which has now been established to be zeolite ZSM-5, Nature 296, 530 (1982), J. Catalysis 61, 390-396 (1980). An organosilicate with very high silica content is described in U.S. Pat. No. 3,941,871. Thus, notwithstanding differences in the specific compositions of these various silicate materials, they are considered to have a sufficient community that they are regarded as belonging to a defined class with recognized common characteristics.

A number of synthetic intermediate pore size zeolites are now known which are useful for their shape selective catalytic properties. Among them are zeolites ZSM-5, ZSM-11, ZSM-22, theta-1 which is isostructural with ZSM-22 and ZSM-23. These zeolites, their properties and utilites are described in Catal. Rev.-Sci. Eng. 28 92&3), 185-264 (1986).

Other synthetic zeolites include, for example, zeolite beta (U.S. Pat. No. 3,308,069), synthetic mordenites including TEA mordenite, TMA-offretite and large pore size zeolites including ZSM-20 and ZSM-4. These materials have been investigated for various utilites in the petrochemical and petroleum refining industries and many uses for them have been found.

These silicate materials are conventionally produced by the crystallization of the silicate from an aqueous gel or slurry which is being prepared by adding a source of silica together with other appropriate ingredients to water and permitting the crystallization to occur under defined conditions which promote the crystallization of the desired species. Silica may be provided by various sources including silica itself in the form of colloidal silica, precipitated silica, silica gel, silica hydrosols or of silica compounds including silicic acid, metal silicates especially sodium silicate or other alkali metal silicates and metallosilicates including aluminosilicates, e.g. sodium aluminosilicates, and other materials which will function as a source of silica for the zeolite. The silica source may also function as a source of other components of the zeolite, for example, sodium aluminosilicate also functions as a source of aluminum. When aluminosilicate are being produced, the aqueous synthesis mixture usually contains a source of silica, a source of alumina, such as an aluminum salt, e.g. aluminum sulfate or aluminum nitrate, water and, in many cases, an organic directing agent of "template" which promotes the formation of the desired species, for example, an amine or a tetra alkylammonium cation such as tetrapropylammonium (TPA) or tetraethylammonium (TEA) cations. U.S. Pat. No. 3,702,886, for example, discloses the use of tetraalkylammonium cations, especially TPA, for the preparation of ZSM-5; U.S. Pat. No. 4,139,600 discloses the use of alkyldiamines; U.S. Pat. No. 4,296,083 discloses the use of ethylenediamine and other amines including trialkylamines, U.S. Pat. No. 4,151,189 discloses the use of various primary amines as a directing agent for ZSM-5, ZSM-12, ZSM-35 and ZSM-38; U.S. Pat. No. 4,565,681 discloses the use of mixed-alkyl ammonium compounds; and U.S. Pat. No. 4,100,262 discloses the use of tetraalkylammonium compounds in combination with a tetraurea cobalt (II) complex. Other systems are also known. However, the presence of the organic component is not necessary since it is possible to produce selected aluminosilicate zeolite species without the use of a directing agent under particular, defined conditions, as described in U.S. Pat. Nos. 4,175,114; 4,119,556; 4,157,885 and 4,341,748 to which reference is made for a description of such processes. Furthermore, control of the composition of the synthesis mixture may result in different zeolites being produced; to take one instance, zeolite beta may be produced using a TEA component under defined ranges of mixture composition, whereas mordenite may be produced under other defined ranges. The effect of these compositional changes is, however, established and there is a significant predictability in the species which are produced from any particular synthesis mixture. This has resulted in the large scale commercial preparation of aluminosilicate zeolites such as the synthesis faujasites especially zeolite Y, zeolite beta and in various forms of ZSM-5 with differing silica: alumina ratios, as well as in the production of certain borosilicate catalysts.

The manufacturing processes used in the commercial scale synthesis of silicate catalytic materials of the types described above conventionally employ large vats or autoclaves for step-wise mixing, gel aging and final crystallization of the product. Processes of this type are reviewed in "Zeolite Molecular Sieves", D.W. Breck, John Wiley and Sons, New York, 1974, Ch. 9 and "Zeolite Chemistry and Catalysts", J. A. Rabo, American Chemical Society, Washington, D.C., 1976. In general, the zeolites have been produced in batch type processes, using large autoclaves, either static or stirred. They may, however, be produced in a continuous process as referred to, for example, in Belgium Pat. No. 869,156, to which reference is made for details of such a continuous process.

Regardless of whether the process is batch or continuous in nature, it is subject to the kinetic limitations of the crystallization mechanism and, generally, this requires a significant amount of time. In order to reduce the expense of the process, it is customary to monitor the degree of crystallinity which has been achieved so that crystallization may be terminated as soon as the product achieves a requisite minimum crystallinity. In the past, this termination of crystallinity has been made by withdrawing a sample of the synthesis mixture and measuring its crystallinity by means of X-ray diffraction of a dried sample. This is relatively intensive in terms of its requirements in time and labor and is generally not suitable for monitoring the progress of crystallization in a continuous operation since it does not provide results rapidly enough to permit satisfactory control of the process variables. It would therefore be desirable to have a more rapid method of determining the progress of the crystallization both for the batch and continuous procedures.

Although measurement of the pH of the crystallization mixture might suggest itself as a means for determining the progress of the crystallization, it is subject to some objections. First, the glass electrodes used for its measurement are fragile which generally precludes their use in the synthesiser vessel itself so that, again, sample withdrawal is required and this debars the technique for use in a continuous synthesis where real-time monitoring of the crystallization is required.

SUMMARY OF THE INVENTION

It has now been found that the crystallinity of the silicate products produced is related to the electrical conductivity of the synthesis mixture. It is therefore possible to employ the electrical conductivity of the synthesis mixture in the determination of the extent of crystallization of the desired product and to control the synthesis in response to the measured conductivity.

According to the present invention there is therefore provided a method of synthesizing a crystalline, silicate solid from a synthesis mixture containing a source of silica. In this method the electrical conductivity of the synthesis mixture is measured during the crystallization of the solid and the crystallinity achieved during the synthesis is determined from the measured electrical conductivity. Depending upon the observed electrical conductivity and, accordingly, the crystallinity achieved at the time of measurement, appropriate measures may be taken to control the progress of the synthesis. For example, in a batch operation, the crystallization may be terminated if an acceptable degree of crystallinity has been achieved or, in the alternative, may be continued for a further period of time, if the product crystallinity is inadequate. In a continuous operation, the process variables, such a crystallizer feed rate and crystallizer temperature, may be varied in order to ensure that the desired degree of crystallinity is achieved.

THE DRAWINGS

In the accompanying drawings:

FIG. 1 is a simplified schematic showing how the measurement of conductivity may be used to control a continuous zeolite synthesis process, and FIGS. 2 and 3 are graphs relating the electrical conductivity of a crystallizer slurry to the progress of the crystallization of two different zeolite products.

DETAILED DESCRIPTION

Figure 1:
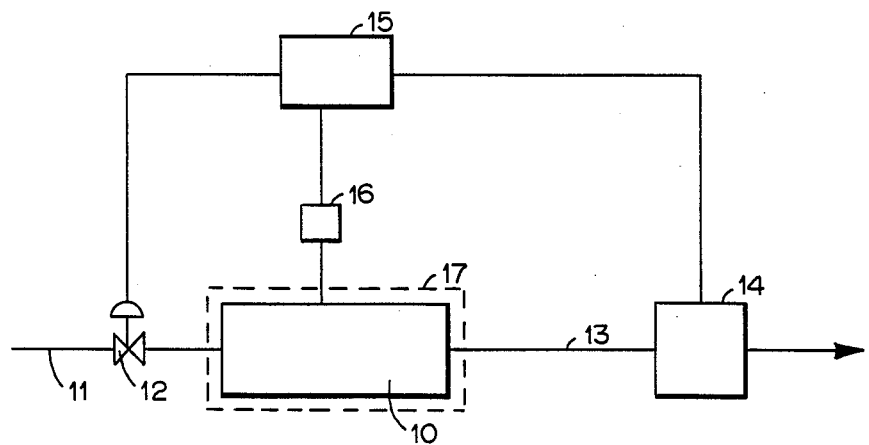

The present invention is applicable to the synthesis of crystalline silicate solids from synthesis mixtures containing a source of silica which provides the silica component of the final, crystalline silicate product. The process is, therefore, particularly applicable to the synthesis of aluminosilicate zeolites which may be produced from such silica containing synthesis mixtures as well as to other metallosilicates including gallosilicates, chromosilicates, borosilicates and ferrosilicates such as those described above, especially the aluminosilicates, borosilicates and ferrosilicates of U.S. Pat. Nos. 3,702,886, 4,269,813 and 4,238,318. It may be used regardless of the content of the trivalent metal which is used in combination with the silica although different crystallization times may be observed with synthesis mixtures of different composition. The ratio of the silica to the trivalent cation may be varied over a wide range according to the composition of the desired silicate product which may typically vary, for example, from a low value of about 2:1 to 3:1 for the aluminosilicate zeolite X, up to extremely high values which in theory may approach infinity for highly siliceous products such as ZSM-5. Thus, the method will be applicable with highly siliceous materials such as the silicates disclosed in U.S. Pat. No. 3,941,871 and the material referred to as a silica-polymorph in U.S. Pat. No. 4,061,724, which is, in fact, ZSM-5 as mentioned above. In most commercial syntheses, however, alumina will be present as a inevitable impurity and extremely high silica:alumina ratios will usually not be obtained unless special measures are taken to exclude aluminum from the synthesis mixture.

In the synthesis of these crystalline, silicate products, a synthesis mixture containing a source of silica is prepared together with other desired components, depending upon the identity of the desired product. The synthesis mixture will, in most cases, be an aqueous mixture but other non-aqueous media such as ethylene glycol may also be used as the continuous phase of the mixture. The use of ethylene glycol based synthesis mixture is described in Bibby, D.M. and Dale, M.P., Formation of High-Silica Sodolite, Nature, 317 (1985), 157-58, to which reference is made for description of the synthesis. The determination of crystallinity by the conductivity measurement is consistent with the use of such non-aqueous media since current carrying species such as hydroxyl ions will be present in such mixtures.

The silica is provided by one or more of the source materials described above and, if aluminum or another trivalent metal is to be present in the final product, it will generally be added in the form of a water soluble salt, such as aluminum sulfate, ferrosulfate, etc., although the metal cations which provide the acidity in the final catalytic product may find their way into the product either as impurities or in the original starting materials. In order to maintain a predetermined composition in the product it will generally, however, be preferable to employ starting materials of known purity and composition so that composition control is maintained. If organic materials are being used to control the identify of the product, they may also be present, for example, tetra alkylammonium cations, eg. tetrapropylammonium (TPA) or tetraethylammonium (TEA) or other nitrogenous bases such as those described above, for example, propylamine, or di-quaternary ammonium materials such as those which may be used in the synthesis of zeolites such as EU-1 as described in U.S. Pat. No. 4,537,754. The use of an organic directing agent is not, however, essential since the crystalline silicate products may be produced in the absence of organics as described, for example, in U.S. Pat. Nos. 4,175,114, 4,199,556, 4,257,885 and 4,341,748. The composition of the synthesis mixtures does not, however, form a part of the present invention since the measurement and control of crystallinity by the use of the electrical conductivity measurement is broadly applicable to the synthesis of all of these and related materials which may be crystallized from silica-containing synthesis mixtures.

The product obtained from the synthesis will depend, naturally, upon the selected synthesis system and may be, for example, an intermediate pore size zeolite such as ZSM-5, ZSM-11, ZSM-12, ZSM-22, ZSM-23, ZSM-35, ZSM-38 or a large pore zeolite such as zeolite Y, ZSM-4 or ZSM-20. Other synthetic zeolites which may be produced from such synthesis mixtures include mordenite, TEA mordenite, TMA offretite, zeolite beta and small pore size zeolites such as zeolite A. The selection of the synthesis mixture will therefore be made in accordance with known factors, depending on the desired product.

The electrical conductivity of the synthesis mixture varies during the progress of the crystallization in a manner which is predictable for any given synthesis system. Thus, each synthesis system will be found to possess a characteristic and predictable relationship between conductivity and product crystallinity, permitting the conductivity to be used as a basis of measurement of crystallinity. Although the change in electrical conductivity is not linear with crystallinity and may, as with ZSM-5, manifest a minimum value at some point during the crystallization process, the conductivity of the mixture may be correlated with the degree of crystallinity achieved in the solid product. Accordingly, the electrical conductivity may be used to monitor the progress of the crystallization. Crystallinity may be continued until the measured conductivity indicates that a selected degree of crystallization has been activated according to the previously established conductivity/crystallinity relationship, for example, a minimum 50 percent crystallinity. Since electrical conductivity may be measured readily and instantaneously by means of simple, robust, in situ equipment, which is commercially available, the progress of the crystallization may be readily monitored. Furthermore, the instantaneous nature of the measurement permits it to be used a basis for controlling a continuous crystallization process. Measurement of the electrical conductivity may also be used in batch crystallization procedures where continuous or intermittent conductivity measurements may eliminate the need for the frequent withdrawal of samples from the crystallizer for a determination of product crystallinity by X-ray diffraction methods which have been conventional up to the present. A further useful aspect of the method is that it enables a check to be made on the composition of the synthesis mixture at the start of the crystallization process since each synthesis mixture has its own characteristic and predictable conductivity value at each point in the synthesis.

In the determination of the product crystallinity, the specific electrical conductivity of the synthesis mixture is measured and from the observed conductivity the crystallinity of the product is determined by correlation with predetermined measurements on the same system. Thus, once the system has been calibrated by measurement of the electrical conductivity at known values of product crystallinity, the subsequent conductivity measurements may serve as a basis for determining crystallinity during subsequent operations.

The electrical conductivity is measured according to conventional procedures to determine the specific conductivity, typically measured in micro-mhos cm.$^{-1}$.

As mentioned above, the specific electrical conductivity does not necessarily vary linearly with crystallinity but may, for example, exhibit a minimum value at some point during the progress of the crystallization. If so, there will be two values of crystallinity which will correspond to one value of the observed electrical conductivity. This will not, however, prove troublesome in practice because generally it is possible to predict with some degree of accuracy the point at which a crystallinity corresponding to the minimum point in the conductivity/crystallinity curve is attained and to adjust the conditions in the crystallizer to ensure that the crystallization has proceeded past this point. In a batch operation this will generally mean that the crystallization should be continued for a period of time which is sufficient to ensure that this conductivity minimum and its corresponding degree of crystallinity has been exceeded so that subsequent measurements of conductivity are made on the ascending portion of the conductivity/time curve where conductivity increases monotonically with time so that the measured values of conductivity may be uniquely related to product crystallinity. In a continuous crystallization process, the progress of the crystallization will generally be sufficiently well established to permit the conductivity measurement to be made on the mixture at a point where the conductivity minimum has been exceeded so that further increases in the measured conductivity may be correlated to increases in the product crystallinity, in like manner. Other conductive/crystallinity relationships may be established by calibration and the empirically determined relationship used as the basis for monitoring the progress of the crystallization and controlling it. If, for instance, the conductivity decreases with increasing crystallinity, the crystallization may be continued until the measured conductivity indicates that the predetermined crystallinity has been achieved. Thus, whatever the conductivity/crystallinity relationship it may, once known, be used as a basis for crystallization measurement and control. hus, a value of conductivity will be selected for the synthesis system in question, depending on an initial system calibration, and the system operated so that, if a variation from the selected conductivity value is noted, suitable corrective action may be taken, whether manually or by a suitable feedback loop control system. Although conductivity is a function of temperature so that variations in the progress of the synthesis will be accentuated if the measurement is made under the slightly elevated temperatures generally used, this is an advantage. If desired, however, the measurement may be made ex situ at a standard reference temperature.

A simplified schematic of a zeolite crystallizer is shown in FIG. 1. A crystallizer 10 which may be a stirred tank reactor, a tubular reactor (plug flow reactor) or a combination of the two, receives a synthesis mixture through feed line 11 with the rate of feed controlled by valve 12. Product is withdrawn from the crystallizer through product line 13 and passed through a conductivity cell 14 in which the specific electrical conductivity of the mixture, by now in the form of a partly crystalline slurry, is measured. The conductivity measurement is fed to a set point controller 15 which adjusts the feed rate by means of value 12 to obtain the desired crystallinity in the product. Alternatively, the set point controller may be used to adjust the temperature of the crystallizer through temperature regulator 16 which controls the crystallizer jacket 17 if a certain production rate is required. Actually, it is possible to control both the feed rate as well as the temperature and, if other process parameters may be varied in order to bring the product crystallinity to the desired level without affecting other characteristics of the product, this also may be done. Control may be affected either manually or according to a predetermined program in automatic, real time process control equipment. Conventionally appropriate control systems will detect a variation in the conductivity from a predetermined value related to the desired crystallinity and will initiate an error signal proportionate to the measured deviation. The error signal will then initiate a proportionate corrective action, e.g. temperature change, flow rate change or both, to reduce the error signal to zero and restore the operating parameters to desired limits. The actual control measures to be affected will, of course, vary according to the synthesis as well as the equipment in use and, accordingly, cannot be fully elucidated here. They will be apparent to the skilled artisan, as will be the nature of control equipment which may be employed to effect the desired control.

Control of the crystallinity by means of measurement of the electrical conductivity of the synthesis mixture is superior to existing methods, such as X-ray powder diffraction, determinations which cannot be performed on line and are, therefore, not susceptible of use with continuous synthesis methods. The present method of determining crystallinity is capable of providing rapid results with relatively cheap, robust equipment which may be adapted to on line, real time measurement for use in controlling a continuous synthesis process and, accordingly, represents a significant improvement in zeolite synthesis and control.

EXAMPLE 1

Zeolite ZSM-5 was synthesized from a mixture of silica (HiSil-244-PPG-trade mark), aluminum sulfate, sodium hydroxide, and n-propylamine at a temperature of 220° F. (104° C.) and with 1 percent ZSM-5seeds. The composition of the starting mixture, in terms of molar ratios of oxides, was as follows:

| | |
|---|---|
| $SiO_2/Al_2O_3$ | 65 |
| $OH^-/SiO_2$ | 0.163 |
| $OH^-/H_2O$ | 0.0163 |
| $N/Al_2O_3$ | 9.17 |

The crystallization was carried out batchwise in a stirred batch reactor at 80 rpm stirrer speed. Samples of the crystallizing slurry were withdrawn at various times and the crystallinity determined by means of X-ray powder diffraction after drawing of the sample. At the time the X-ray samples were removed, the specific electrical conductivity of the slurry was measured in a conductivity cell using a conductance meter (YS1 Model 33 Portable Conductivity/Salinity Meter), withdrawing the sample, cooling to 25° C., introducing the sample into the cell and allowing the conductivity reading to attain equilibrium. The results are shown in Table 1 below.

TABLE 1

| Time, Hrs. | % Crystallinity (X-ray)* | Sp. Conductivity mhos/cm |
|---|---|---|
| 30 | 15 | 35,000 |
| 35 | 25 | 33,000 |
| 40 | 55 | 32,000 |
| 43 | 85 | 35,000 |
| 45 | 95 | 37,000 |
| 47 | 90 | 38,000 |
| 49 | 100 | 38,500 |
| 51 | 100 | 39,000 |
| 55 | 95 | 39,500 |
| 66 | 100 | 40,000 |

*Based on comparison with reference material

Figure 2:
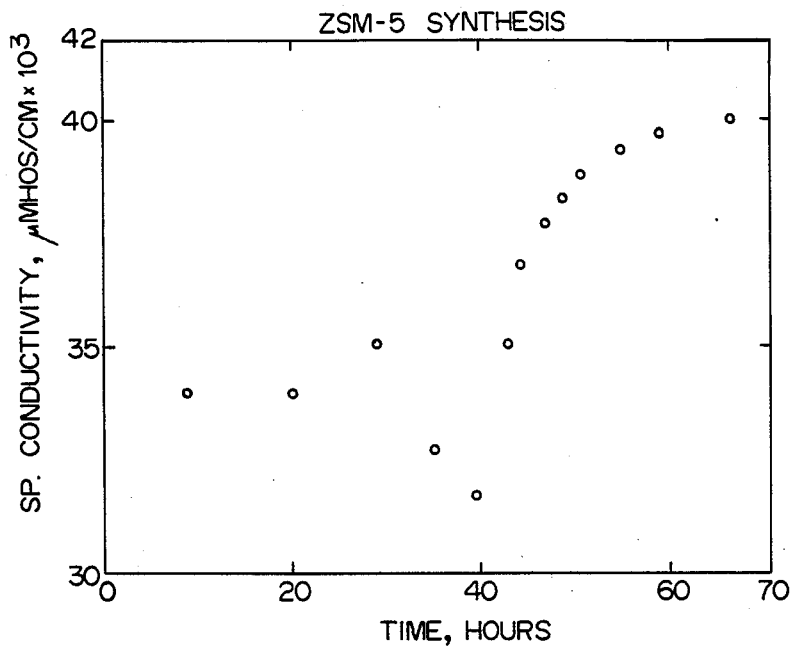

The relationship between conductivity and the progress of the crystallization is also shown in FIG. 2 of the drawings. There is minimum in the conductivity/crystallization time curve at about 40 hours and about 50% crystallinity but the conductivity subsequently increases with a definite crystallization as indicated by the crystallization time is also shown in FIG. 2 of the drawings. There is a minimum to be measured indirectly by means of conductivity measurements.

EXAMPLE 2

Figure 3:
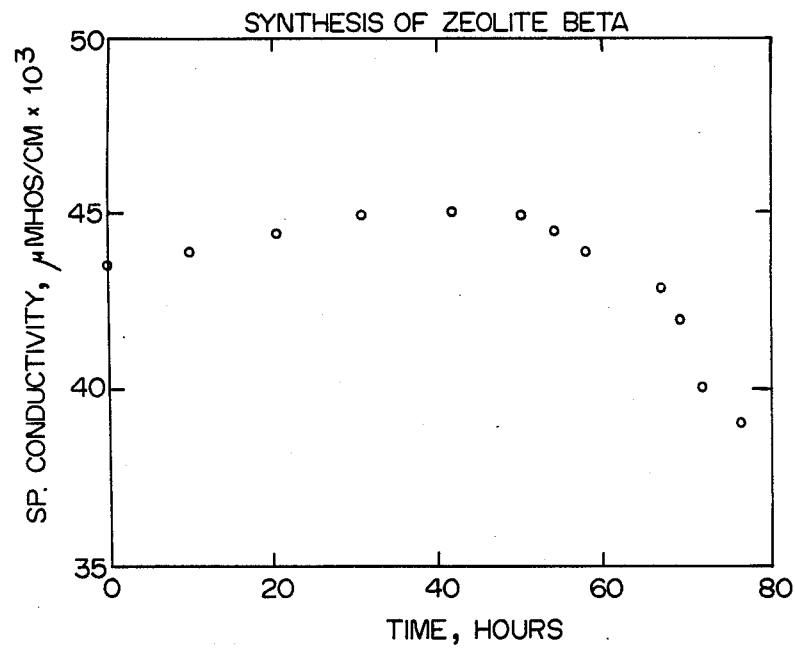

A zeolite beta synthesis mixture containing $SiO_2$, $Al_2O_3$, NaOH, TEABr and $H_2O$ in the following ratios: $SiO_2/Al_2O_3 = 39.6$, $OH^-/SiO_2 = 0.158$, $H_2O/SiO_2 = 18.67$, $N/Al_2O_3 = 11.74$, and containing 5% seeds were heated to 280° F. (138° C.) in a stirred autoclave at 250 RPM. During the course of the synthesis, samples were withdrawn for measurement of specific conductivity, pH and x-ray crystallinity. These results are provided in Table 2 and in FIG. 3. From this Table as well as from FIG. 3 it is seen that the specific conductivity is fairly constant up to the onset of crystallization, as measured by x-ray crystallinity. As crystallinity progresses the specific conductivity of the synthesis mixture decreases monotonically until full crystallinity (65% is taken here to be fully crystalline) is observed.

TABLE 2

| Time, Hours | Sp. Conductivity, Micro mhos/cm | pH | Crystallinity by XRD* |
|---|---|---|---|
| 0 | 43,500 | 11.53 | Amorphous |
| 9 | 44,000 | 11.61 | " |
| 20 | 44,500 | 11.67 | " |
| 30 | 45,000 | 11.71 | " |
| 42 | 45,000 | 11.71 | " |
| 50 | 45,000 | 11.70 | " |
| 54 | 44,500 | 11.70 | Trace |
| 57 | 44,000 | 11.67 | Trace |
| 66 | 43,000 | 11.68 | 35% |
| 70 | 42,000 | 11.69 | 45% |
| 74 | 40,000 | 11.65 | 55% |
| 78 | 39,000 | 11.67 | 65% |

*Based on comparison with reference material.

We claim:

1. A method of synthesizing a solid crystalline silicate product from a crystallization mixture including a source of silica which comprises:
   establishing a relationship between the specific electrical conductivity of the crystallization mixture and the crystallinity of the solid product,
   crystallizing the crystalline silicate product from the crystallization mixture,
   measuring the specific electrical conductivity of the crystallization mixture;
   continuing to crystallize the mixture until the specific electrical conductivity achieves a value which, from the relationship established between the specific electrical conductivity and the crystallinity of the solid product, is indicative of a selected crystallinity; and
   terminating crystallization when the selected crystallinity has been achieved.

2. A process according to claim 1 in which the crystallization mixture comprises water, a source of silica and a source of alumina and the silicate product comprises an aluminosilicate.

3. A process according to claim 1 in which the crystallization of the silicate product is continued to a point at which the specific electrical conductivity increases with increasing product crystallinity.

4. A process according to claim 2 in which the aluminosilicate is ZSM-5.

5. A process according to claim 4 in which the crystallization is continued until after a time at which the conductivity of the mixture exceeds a minimum value.

6. A continuous zeolite crystallization method in which a crystalline zeolite product is synthesized from a synthesis mixture including a source of silica, which mixture is passed through a continuous flow crystallization reactor to form a reactor effluent and the crystalline zeolite recovered from the reactor effluent, the method comprising the steps of (i) establishing a relationship between the crystallinity of the zeolite product and the specific electrical conductivity of the synthesis mixture,
   (ii) measuring the specific electrical conductivity of the reactor effluent, (iii) controlling the conditions of the crystallization in response to the measured specific conductivity indicative of the crystallinity of the zeolite product according to the relationship established between the crystallinity of the zeolite product and the specific electrical conductivity of the synthesis mixture.

7. A method according to claim 6 in which the temperature of the mixture in the reactor is controlled in response to the measured specific electrical conductivity.

8. A method according to claim 6 in which the flow rate of the synthesis mixture through the reactor is controlled in response to the measured specific electrical conductivity.

9. A method according to claim 6 in which the temperature of the mixture in the reactor and its flow rate through the reactor are controlled in response to the measured specific electrical conductivity.

10. A method according to claim 6 which comprises the additional steps of (iv) detecting a deviation in the value of the measured specific electrical conductivity from a specified value and (v) making a corrective variation in the crystallization conditions to reduce the deviation.

11. A method according to claim 10 in which the corrective variation is made by (vi) creating an error signal proportionate to the deviation and (vii) using the error signal to initiate a corrective variation proportionate to the error signal.

12. A method according to claim 6 in which the synthesis mixture comprises water, a source of silica and a source of alumina and the zeolite comprises an aluminosilicate.

13. A method according to claim 12 in which the aluminosilicate is ZSM-5.

14. A method of monitoring the synthesis of a crystalline silicate product from a synthesis mixture comprising a source of silica, which method comprises (i) establishing a relationship between the crystallinity of the crystalline silicate product and the specific electrical conductivity of a synthesis mixture from which the product is crystallized, (ii) forming the crystalline silicate product from the synthesis mixture, (iii) measuring the specific electrical conductivity of the synthesis mixture and (iv) correlating the measured specific electrical conductivity with the crystallinity of the product from the relationship established between the crystallinity of the silicate product and the specific electrical conductivity of the mixture.

15. A method according to claim 14 in which the synthesis mixture is an aqueous synthesis mixture comprising a source of silica and a source of alumina and the silicate product comprises an aluminosilicate.

16. A method according to claim 15 in which the aluminosilicate is zeolite ZSM-5.

17. A method of determining the crystallinity of a solid, crystalline aluminosilicate product during the course of its synthesis from an aqueous synthesis mixture comprising a source of silica and a source of alumina, which method comprises (i) establishing a relationship between the specific electrical conductivity of the synthesis mixture and the crystallinity of the aluminosilicate product, (ii) crystallizing the product from the synthesis mixture, (iii) measuring the specific electrical conductivity of the synthesis mixture and (iv) correlating the measured specific conductivity with the established relationship with product crystallinity so as to determine a selected crystallinity of the product.

* * * * *